(12) United States Patent
Joo

(10) Patent No.: US 9,282,515 B2
(45) Date of Patent: Mar. 8, 2016

(54) METHOD OF SYNCHRONIZATION AND LINK ACCESS FOR LOW ENERGY CRITICAL INFRASTRUCTURE MONITORING NETWORK

(75) Inventor: Seong-Soon Joo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 469 days.

(21) Appl. No.: 13/620,060

(22) Filed: Sep. 14, 2012

(65) Prior Publication Data

US 2013/0070582 A1    Mar. 21, 2013

(30) Foreign Application Priority Data

Sep. 16, 2011  (KR) .................. 10-2011-0093388
Sep. 14, 2012  (KR) .................. 10-2012-0102402

(51) Int. Cl.
*H04W 72/04* (2009.01)
*H04W 52/02* (2009.01)
*H04L 29/14* (2006.01)
*H04J 3/06* (2006.01)
*H04L 1/16* (2006.01)
*H04L 1/18* (2006.01)
*H04W 56/00* (2009.01)
*H04W 4/00* (2009.01)

(52) U.S. Cl.
CPC ...... *H04W 52/0216* (2013.01); *H04W 52/0229* (2013.01); *H04L 1/16* (2013.01); *H04L 1/1858* (2013.01); *H04W 4/005* (2013.01); *H04W 52/0219* (2013.01); *H04W 56/001* (2013.01); *H04W 56/0075* (2013.01)

(58) Field of Classification Search
CPC .......... H04W 56/001; H04W 56/0015; H04W 56/004; H04W 56/0045; H04W 56/005; H04W 56/0055; H04W 74/08; H04W 74/06; H04W 74/0816; H04W 74/0825; H04L 1/1657; H04L 1/1819; H04L 1/16; H04L 1/1816; H04L 1/1858; H04L 12/413
See application file for complete search history.

(56) References Cited

U.S. PATENT DOCUMENTS 8,325,665 B2 *  12/2012  Kim .................. H04W 16/14
                                               370/329
8,432,887 B1 *   4/2013  Ding .................. H04B 7/2643
                                               370/348

(Continued)

FOREIGN PATENT DOCUMENTS

KR    10-2007-0105731 A    10/2007

OTHER PUBLICATIONS

Joo, "Relayed Slot-Link Network (RSLN) draft for TG4k", IEEE P802.15 Working Group for Wireless Personal Area Networks (WPANs), pp. 1-39, Jul. 18, 2012.

*Primary Examiner* — Candal Elpenord
(74) *Attorney, Agent, or Firm* — Rabin & Berdo, P.C.

(57) ABSTRACT

The present invention provides a time synchronization method in a low energy critical infrastructure monitoring network and a coordinate access method using a superframe. According to the exemplary embodiments of the present invention, time synchronization can be promptly and efficiently performed in the low energy critical infrastructure monitoring network, a link access method with three grades of link access can be provided, and a frame structure and a process for link generation, link management, and extended connection are provided.

10 Claims, 11 Drawing Sheets

(56) References Cited

U.S. PATENT DOCUMENTS

| | | | | |
|---|---|---|---|---|
| 8,804,584 B2 * | 8/2014 | Stewart | H04W 40/026 | 370/311 |
| 2003/0137966 A1 * | 7/2003 | Odman et al. | | 370/347 |
| 2006/0007907 A1 * | 1/2006 | Shao | H04W 72/1231 | 370/347 |
| 2006/0270438 A1 * | 11/2006 | Choi | H04W 48/16 | 455/522 |
| 2007/0086424 A1 * | 4/2007 | Calcev | H04J 3/0641 | 370/350 |
| 2008/0095126 A1 * | 4/2008 | Mahany | H04W 48/08 | 370/338 |
| 2009/0161653 A1 * | 6/2009 | Kumar | H04L 7/041 | 370/350 |
| 2010/0080156 A1 * | 4/2010 | Nichols | H04W 52/0216 | 370/311 |
| 2010/0197228 A1 * | 8/2010 | Dong | H04J 3/0644 | 455/41.2 |
| 2011/0206017 A1 * | 8/2011 | Taghavi | H04B 1/719 | 370/336 |
| 2011/0216747 A1 * | 9/2011 | Shao | H04W 56/0065 | 370/338 |

* cited by examiner

METHOD OF SYNCHRONIZATION AND LINK ACCESS FOR LOW ENERGY CRITICAL INFRASTRUCTURE MONITORING NETWORK

CROSS-REFERENCE TO RELATED APPLICATION

This application claims priority to and the benefit of Korean Patent Application No. 10-2011-0093388 and 10-2012-0102402 filed in the Korean Intellectual Property Office on Sep. 16, 2011 and Sep. 14, 2012, the entire contents of which are incorporated herein by reference.

BACKGROUND OF THE INVENTION (a) Field of the Invention

The present invention relates to a synchronization and link access method in a low energy critical infrastructure monitoring network.

(b) Description of the Related Art

A low energy critical infrastructure monitoring (MECIM) network is a network for connection of sensor devices in wire areas including on the ground, under the ground, in water, or in buildings. Since the sensor devices are installed in places where repair and maintenance cannot be easily performed, the sensor devices should be operated with independent power for more than several years, and the sensor devices are required to periodically transmit data in a changeable wireless environment.

FIG. 1 shows a coordinator and an endpoint device of an LECIM network.

Referring to FIG. 1, a single coordinator is connected with a plurality of endpoint devices. FIG. 1 exemplarily illustrates four endpoint devices, but typically, one coordinator may be connected with 1000 or more endpoint devices.

Each endpoint device may generate sensing data of several tens to several hundreds of bites, and single data may be generated in one day or single data may be generated every score of seconds. Since the coordinator has no energy limit because it uses permanent energy, a transmission range and a number of transmissions have no restriction. However, each endpoint device (e.g., a battery) using independent power has a restriction in transmission range and a number of transmissions. Therefore, the endpoint device should assure reliability in transmission data while minimizing energy consumption and should successfully receive a network configuration control message from the coordinator.

However, the endpoint device consumes energy for waiting for reception of wireless signals and transmission of wireless signals, and therefore a transmission success rate of a signal that requires data transmission should be high for minimizing energy consumption and a transmission/reception process for additional frames should be minimized.

In this case, the transmission success rate is changed depending on a competition between the endpoint devices for occupying a link to the coordinator, frequency interference of other wireless devices, and the like. Therefore, a method for efficiently controlling a contention node and link occupation with a hidden node in a wireless transmission area is required for the endpoint device.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for efficiently generating and controlling link access between a node of an endpoint device and the like and a coordinator.

According to one aspect of the present invention, a time synchronization method of a device included in a low energy network is provided. The time synchronization method includes: sequentially receiving a plurality of beacons including a first beacon and a second beacon from a coordinator include in the network; estimating a beacon interval based on the plurality of beacons; calculating a sleep time based on the beacon interval; sleeping for the sleep time, and then receiving a third beacon from the coordinator during a beacon reception waiting time; when receiving the third beacon, estimating a reception time of the third beacon based on serial number information included in the third beacon and the beacon interval; calculating an offset that is a difference between the estimated reception time of the third beacon and an actual reception time of the third beacon; and time-synchronizing based on the offset of the third beacon and an offset of at least one of the plurality of beacons.

According to another aspect of the present invention, a coordinate access method of an endpoint device included in a low energy network is provided. The method includes: allocating a plurality of candidate time slots including first, second, and third candidate time slots that are determined by the coordinator based on an address of the endpoint device and the entire number of time slots included in a superframe, from the coordinator; and transmitting a data frame using at least one of the plurality of candidate time slots.

According to another feature of the present invention, a frame retransmission method of a link expander included in a low energy network is provided. The frame retransmission method includes: receiving frames respectively from a coordinator and an endpoint device in the network; received from the coordinator and the endpoint device during a time period that corresponds to an integer times a beacon transmission interval of the coordinator; in a partial link expansion mode, retransmitting all the frames received from the coordinator to the endpoint device; and in the partial link expansion mode, retransmitting a network management message of the endpoint device in the frames received from the endpoint device to the coordinator.

As described, according to an exemplary embodiment of the present invention, prompt and efficiency time synchronization can be achieved by using the time synchronization method for the beacon-based critical infrastructure network. In addition, three grades of link access are provided to minimize contention with other endpoint devices, reduce energy consumption, and provide various quality data transmission methods. Further, frame structure and process for link generation, link management, and range extension of the LECIM network are provided so that the devices included in the LECIM network can be operated with low energy, thereby improving the life-span of the LECIM network.

DETAILED DESCRIPTION OF THE EMBODIMENTS

Figure 1:
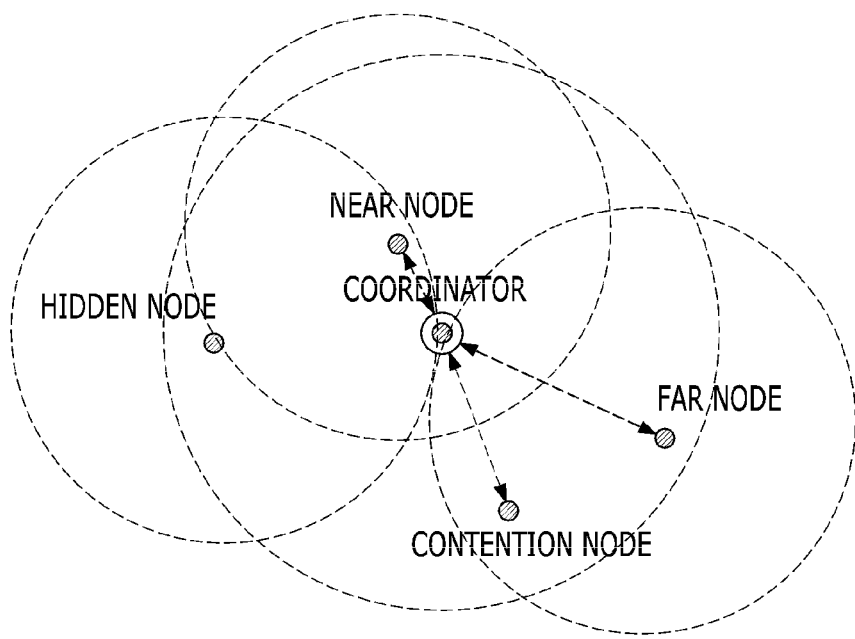
FIG. 1 shows a coordinator and an endpoint device in an LECIM network.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
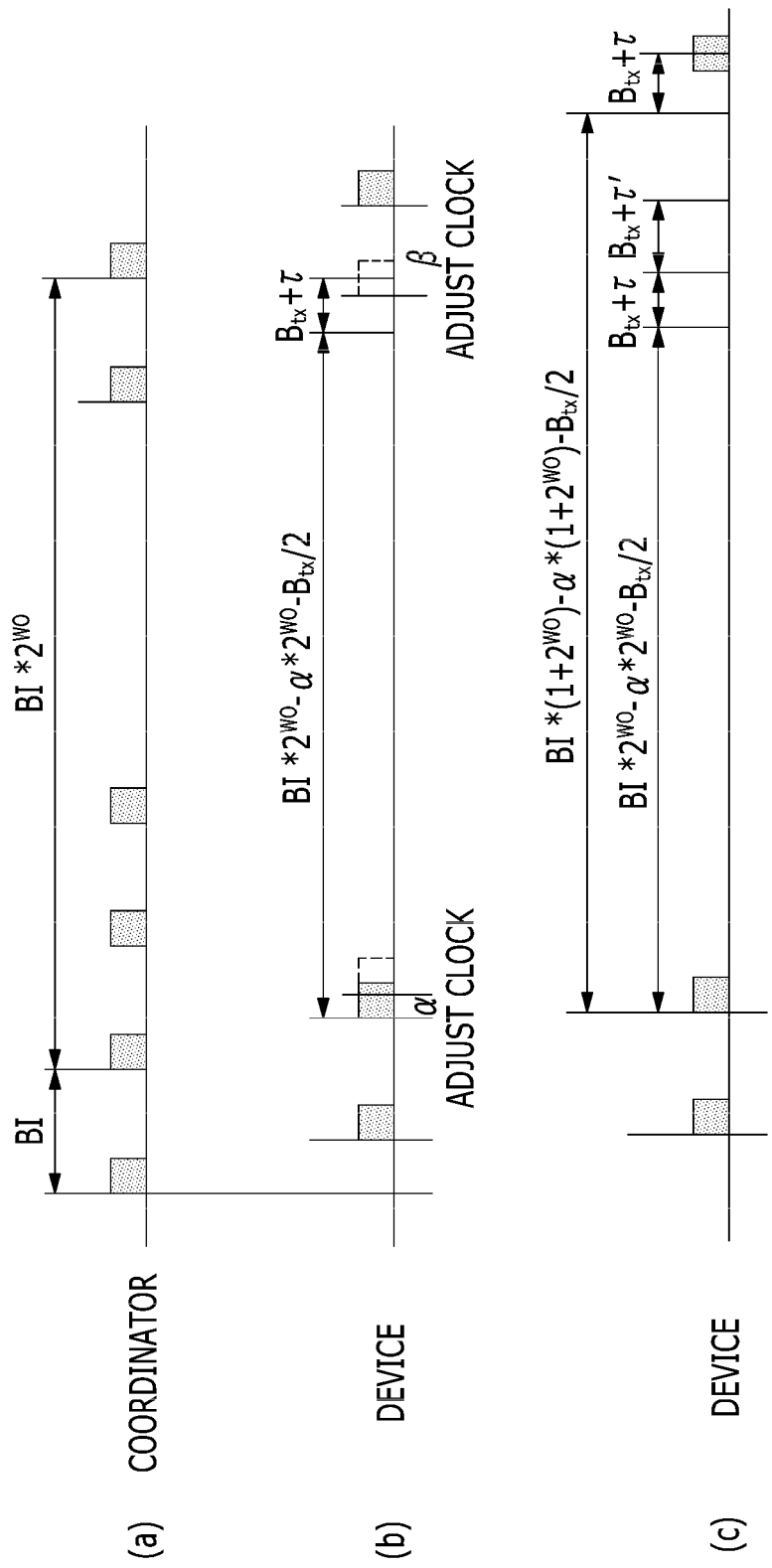
FIG. 2 shows a time synchronization process in the LECIM network according to the exemplary embodiment of the present invention.
Figure 3:
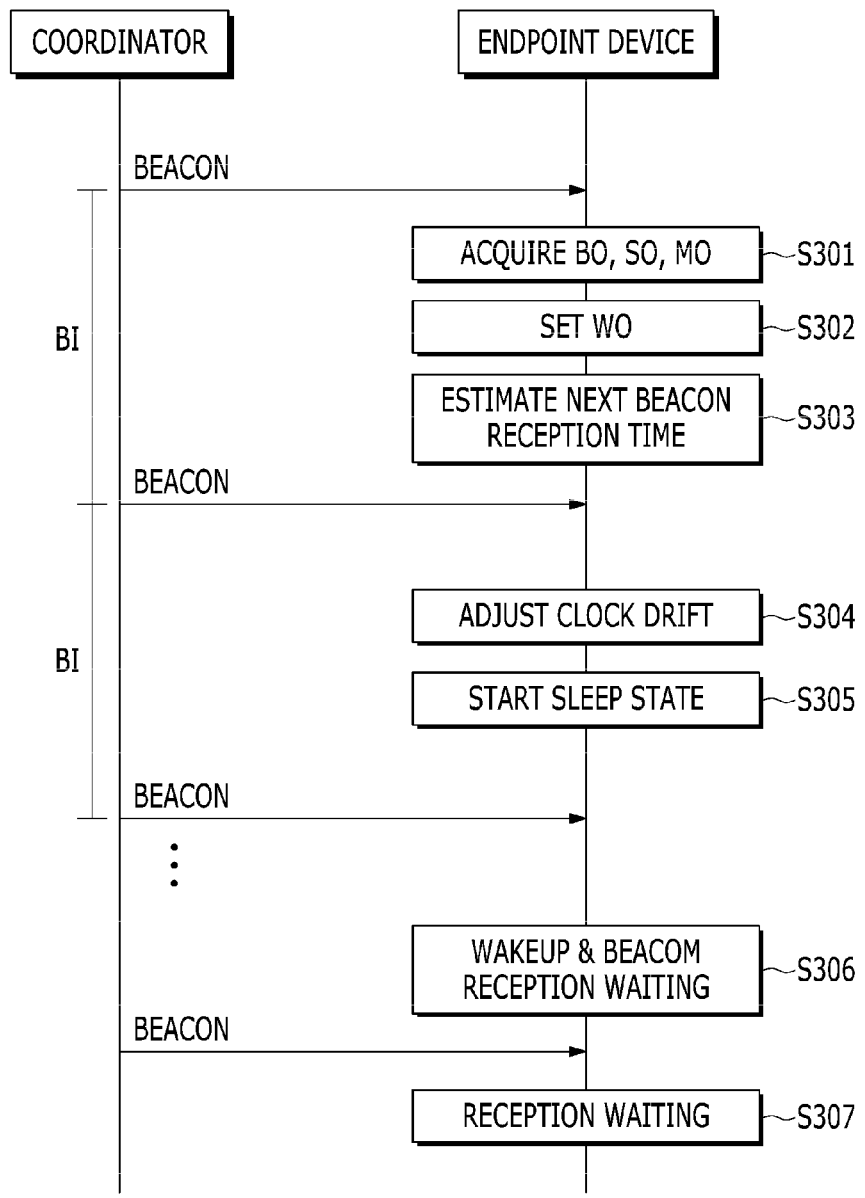
FIG. 3 is a flowchart of a time synchronization method in the LECIM network according to the exemplary embodiment of the present invention.

FIG. 2 shows a time synchronization process in the LECIM network according to the exemplary embodiment of the present invention, and FIG. 3 is a flowchart of a time synchronization method in the LECIM network according to the exemplary embodiment of the present invention. Hereinafter, a visual synchronization method in the LECIM network will be described with reference to FIG. 2 and FIG. 3.

In the LECIM network, endpoint devices of all areas should be time-synchronized, and data sensed in the endpoint should be transmitted to the coordinator according to the synchronized time, together with sensing time information. In this case, each endpoint device may have a different clock drift, and time information is provided once, time information extracted from each endpoint device cannot be easily synchronized as time laps. For this, the coordinator may periodically provide time synchronization to the endpoint device, but in this case, the endpoint device consumes a large amount of energy for periodically receiving time synchronization frame.

In FIG. 2 and FIG. 3, a method for continuing time synchronization for a relatively long period of time between the coordinator and the endpoint device is illustrated. Referring to FIG. 2, the endpoint device estimates a clock drift using a beacon provided with a beacon interval (hereinafter referred to as "BI") by the coordinator, converts into a sleep state, and receives a beacon again for time synchronization after a predetermined time. A time set for receiving beacons again may be $BI*2^{WO}$ second (WO=wakeup order).

Referring to (a) of FIG. 2, the coordinator continuously broadcasts a beacon including serial number information with the BI. In addition, the endpoint device having received the beacon from the coordinator acquires a beacon order (referred to as "BO"), a superframe order (referred to as "SO"), and a multisuperframe order (referred to as "MO") (S301). The endpoint device sets a WO based on the acquired BO, SO, and MO (S302).

Referring to (b) of FIG. 2, after receiving the first beacon, the endpoint device estimates a reception time of the second beacon based on a clock of the endpoint device (S303). After that, when receiving the second beacon, the endpoint device calculates a difference (i.e., clock drift) between the reception time and the estimated reception time. In addition, a clock drift value is "a" (S304).

After that, the endpoint device enters a sleep state (S305), and when the sleep state is passed, the endpoint device is woken up and receives beacons again (S306). In this case, the sleep time may be set as given in Equation 1.

$$(BI+\alpha)*2^{WO} - B_{rx}/2 \qquad \text{(Equation 1)}$$

"BI+α" is a beacon interval estimated by the endpoint device, and the sleep time may be determined to be $B_{rx}/2$ before a value acquired by multiplying $2^{WO}$ by the estimated beacon interval. The reason for previously determining $B_{rx}/2$ is that the endpoint device should wakeup before receiving beacons again.

$B_{rx}$ is a time for receiving all beacon frames, and may be determined according to the length of a beacon frame and a transmission speed of a physical layer (hereinafter, referred to as "PHY"). In this case, $B_{rx}$ is provided for the endpoint device to be able to wait for reception in advance before the beacon frame reaches the endpoint device.

The endpoint device is woken up after the sleep time is passed, and maintains a beacon waiting state for "$B_{rx}+\tau$". In this case, "τ" denotes a value from $B_{rx}/2$ to $B_{rx}$, and the endpoint device waits for the first beacon for $B_{rx}/2$ and waits for the second beacon for $B_{rx}$.

When receiving the beacons during a period from the sleep to the beacon reception waiting time ($B_{rx}+\tau$), the endpoint device calculates a clock drift according to beacon serial number information included in the received beacon. That is, a value obtained by multiplying the beacon serial number by the estimated BI (BI+α) may be the estimated reception time of the received beacon.

In this case, a difference between the estimated beacon reception time and the actual beacon reception time is calculated and the difference is referred to as "β".

In addition, the endpoint device changes the clock drift value to $\alpha+\beta/2^{WO}$ and reflects $\alpha+\beta/2^{WO}$ to Equation 1 to reset the wakeup time (S307). And the new clock drift value calculated each time may be statistically processed and applied to the time synchronization.

FIG. 2 illustrates a case (a) in which no beacon is received during the beacon reception waiting time in (b). Referring to (c) of FIG. 2, when the endpoint device fails to receive a beacon, the endpoint device changes the beacon reception waiting time to "$B_{rx}+\tau$" and waits for beacons. When the endpoint successfully receives a beacon, the endpoint device repeats a process after the sleep state in (b) of FIG. 2.

However, when the reception of the beacon has failed during the changed beacon reception waiting time, the sleep state is extended as given in Equation 2.

$$(BI+\alpha)*(1+2^{WO})-B_{tx}/2 \quad \text{[Equation 2]}$$

After that, when the endpoint device receives a beacon during the beacon reception waiting time ($B_{rx}+\tau$) after the sleep state, the endpoint device repeats the operation after the sleep state in (b) of FIG. 2.

When the reception of beacons has failed after the extended sleep state, the endpoint device performs an initial beacon scan process.

Figure 4:
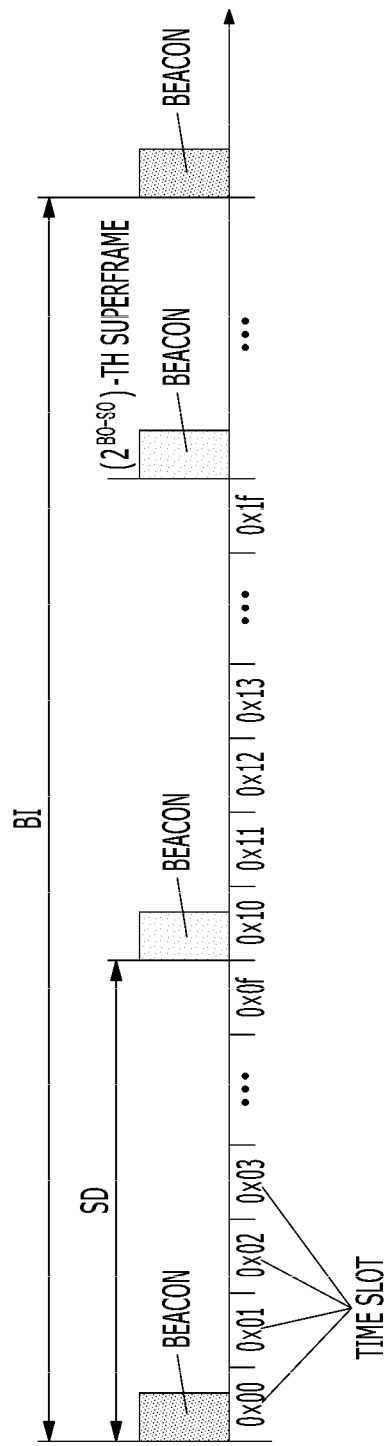
FIG. 4 shows a frame for an endpoint to access the coordinator in the LECIM network according to the exemplary embodiment of the present invention.

FIG. 4 shows a frame for access to the coordinator of the endpoint device in the LECIM network according to the exemplary embodiment of the present invention.

According to the exemplary embodiment of the present invention, slot-based access control is performed to temporally distribute access contention of the endpoint devices in the LECIM network where beacons for time synchronization exist. In addition, data transmission is attempted without pre-establishing a connection between the coordinator and the endpoint device for minimizing overhead in the data transmission.

In addition, a multi-superframe that can include a plurality of superframes may be applied to a frame according to the exemplary embodiment of the present invention to provide slots to 1000 or more endpoint devices connected to the coordinator. The multi-superframe enables peer-to-peer (P2P) communication, and topology restriction, end-to-end data transmission path redundancy, and reliability problems can be solved.

According to the exemplary embodiment of the present invention, each superframe includes 16 slots 00 to 0f, and a BI may be given as follows.

$$BI=2^{BO}*\text{aBaseSuperframeDuration}$$

In this case, BI denotes an interval of beacons transmitted first in the multi-superframe.

In addition, a superframe duration (SD) is given as follows, $$SD=2^{SO}*\text{aBaseSuperframeDuration},$$

and the number of superframes included in the BI (i.e., one multi-superframe) is $2^{BO-SO}$ (BO-SO is a multiframe order, and is referred to as "MO"). Therefore, the last superframe included in the multi-superframe is the $(2^{BO-SO})$-th frame.

aBaseSuperframeDuration is 16 times the aBaseSlotDuration, and the duration of one slot is $2^{SO}*\text{aBaseSlotDuration}$.

The number of slots to be allocated to each endpoint device may be set by applying a modulo operation with the entire number of time slots to a value obtained by hashing an address of the endpoint device. For example, the number of slots may be set as given in Equation 3.

$$(\text{device }ID*\text{device }ID)\bmod(16*2^{BO-SO}) \quad \text{[Equation 3]}$$

In this case, the endpoint device may have three candidate time slots for each BI, and thus the number of time slots can be calculated from the address of the endpoint device by applying three orthogonal hashing functions.

Figure 5:
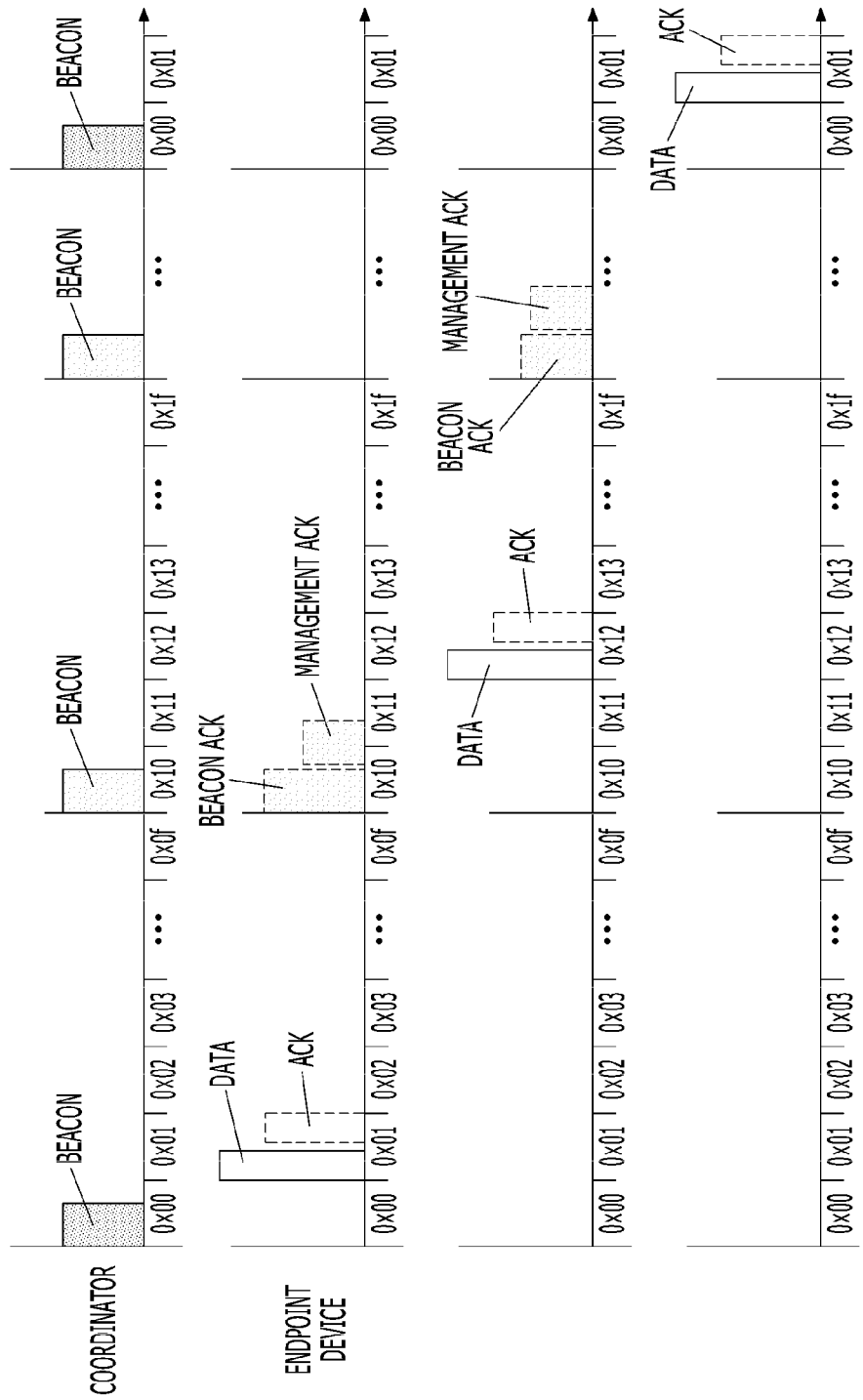
FIG. 5 shows a coordinator access method using a grade 0 link access according to the exemplary embodiment of the present invention.

FIG. 5 shows a coordinator access method using a grade 0 link according to the exemplary embodiment of the present invention.

A link from the endpoint device to the coordinator may be classified into three grades according to data transmission priority. The grade 0 link access is link access for providing highly reliable data transmission in real time, the grade 1 link access is link access for determination of data transmission, and the grade 2 link is link access that cannot determine data transmission. Meanwhile, time slot 0 of the superframe is used for the data transmission from the coordinator to the endpoint device.

Referring to FIG. 5, when the endpoint device uses the grade 0 link access, a slot in the first candidate time slot begins and, at the same, time the endpoint device transmits a frame without a clear channel assessment (CCA) and waits for an acknowledge (ACK) message from the coordinator during the first candidate time slot.

When no ACK message is transmitted from the coordinator, the endpoint devices sleeps until receiving a beacon in the next superframe, and then determines an ACK message in a network management frame in the beacon slot. That is, when using the grade 0 link access, the endpoint devices determines two times whenever a frame is transmitted once so that highly-reliable data transmission can be performed in real time.

When no ACK message is received, the endpoint device repeats the above-stated process using the second candidate time slot. When reception of an ACK message has failed, the endpoint device repeats the above-stated process using the first candidate time slot again after the next multi-superframe is started.

Figure 6:
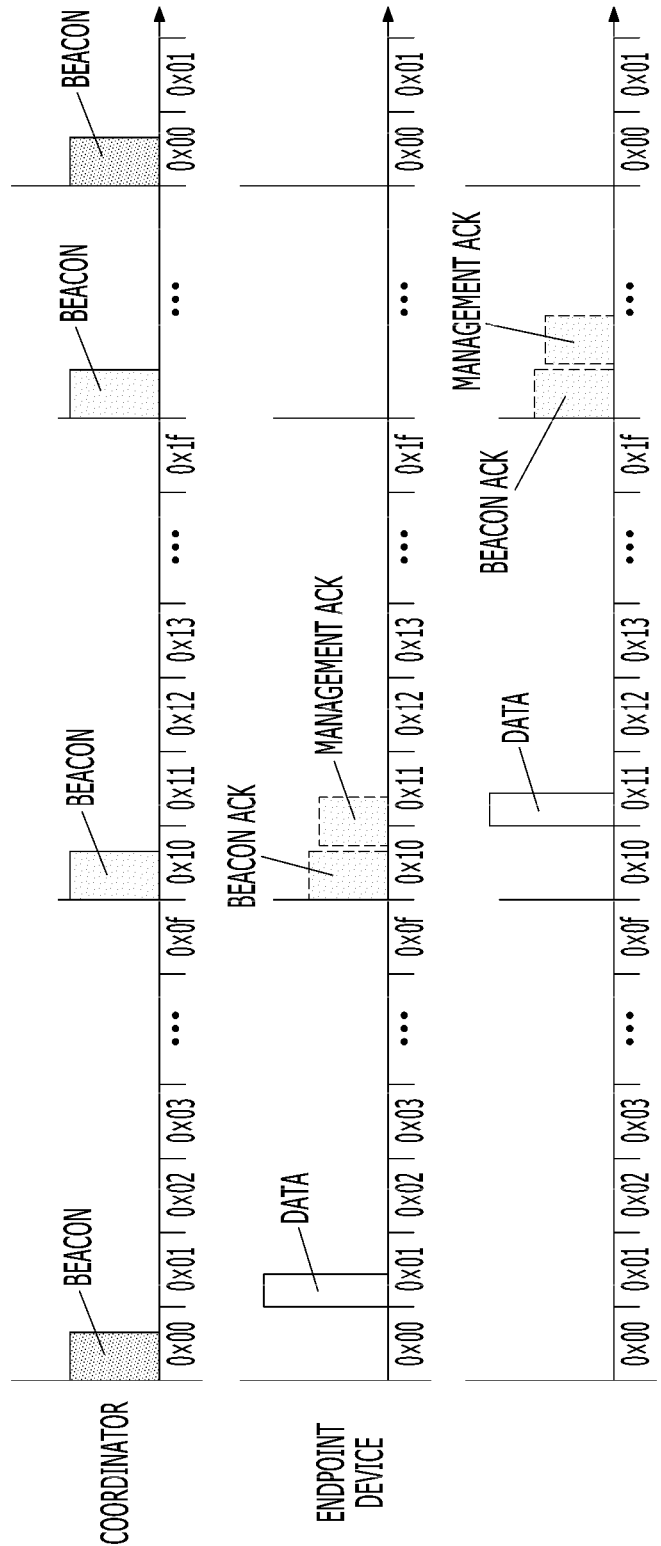
FIG. 6 shows a coordinator access method using a grade 1 link access according to the exemplary embodiment of the present invention.

FIG. 6 shows a coordinator access method using the grade 1 link access according to the exemplary embodiment of the present invention.

Referring to FIG. 6, when the grade 1 link access is used, a slot in the first candidate time slot is started, and at the same time, the endpoint device transmits a frame without CCA and then sleeps until receiving a beacon in the next superframe. After that, the endpoint device determines reception of an ACK message in the network management frame in the beacon slot. When no ACK is received, the endpoint device repeats the above-stated process using the second candidate time slot.

That is, the endpoint device using the grade 1 link access determines reception of an ACK message once whenever a frame is transmitted once, and does not try frame transmission in the next multi-superframe even though no ACK message is received after the frame is retransmitted using the second candidate time slot.

Figure 7:
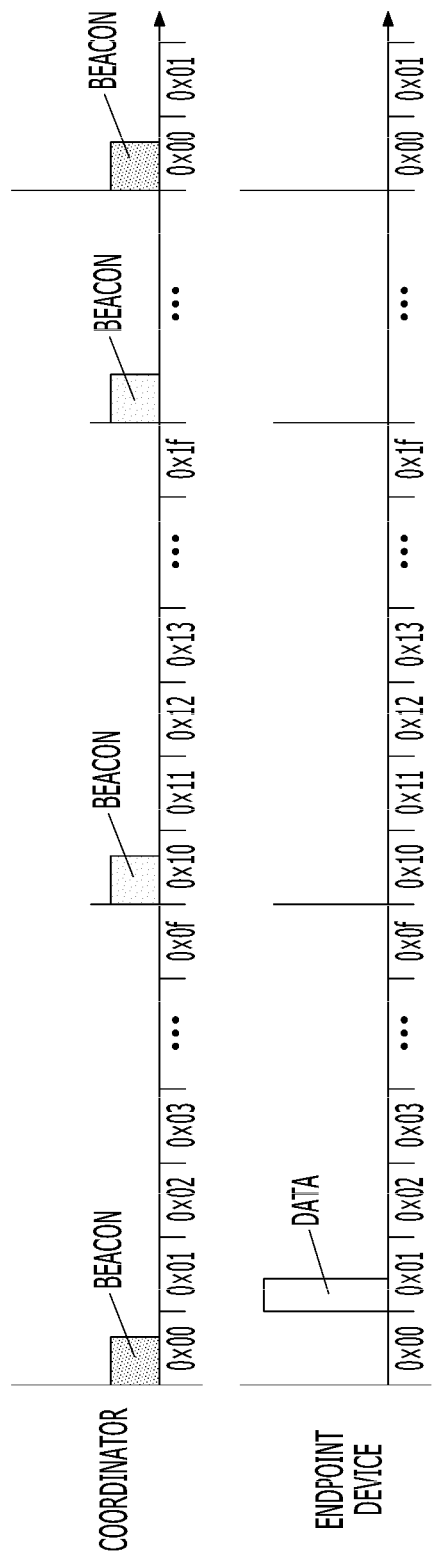
FIG. 7 shows a coordinator access method using a grade 2 link access according to the exemplary embodiment of the present invention.

FIG. 7 shows a coordinator access method using the grade 2 link access according to the exemplary embodiment of the present invention.

Referring to FIG. 7, when the grade 2 link access is used, a slot in the first candidate time slot is started, and at the same time, a frame is transmitted without CCA. Therefore, there is no process for determining reception of an ACK message after a frame is transmitted once.

Figure 8:
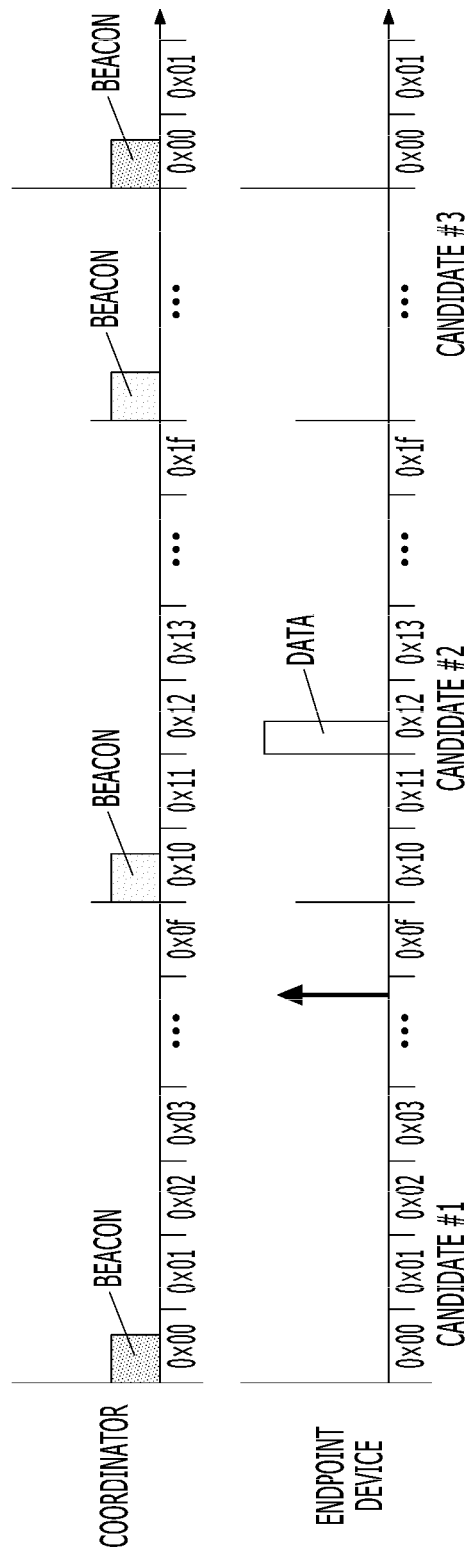
FIG. 8 shows a coordinator access method for transmission of an urgent message according to the exemplary embodiment of the present invention.

FIG. 8 shows a coordinator access method for transmission of an urgent message according to the exemplary embodiment of the present invention.

For transmission of an urgent message from the endpoint device to the coordinator, the earliest slot in the wakeup of the endpoint device is used among the three candidate time slots.

Figure 9:
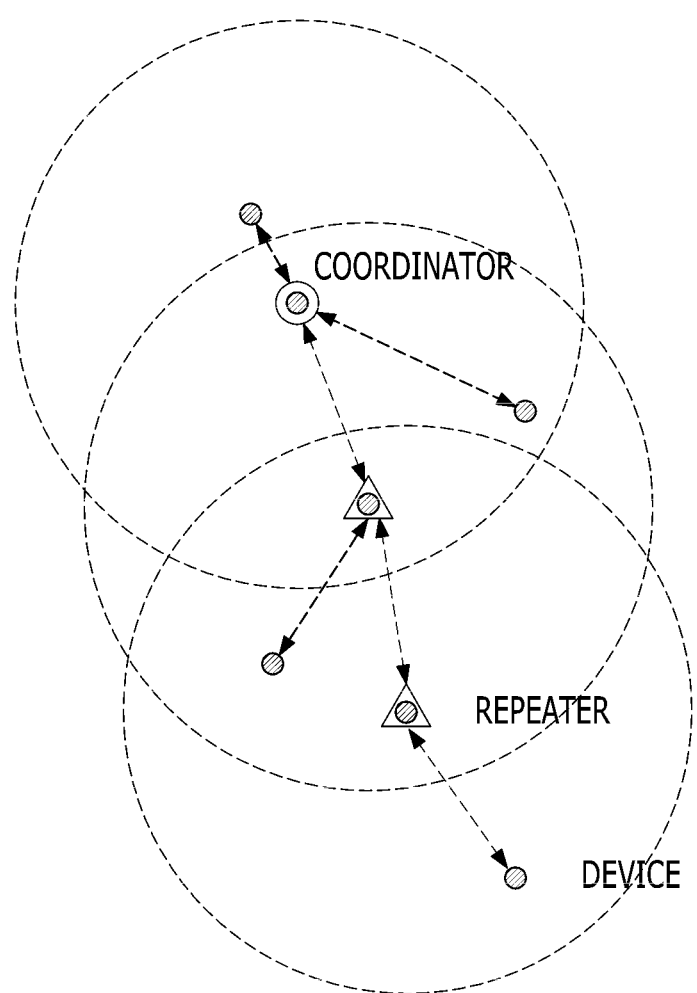
FIG. 9 shows LECIM link extension equipment in the LECIM network according to the exemplary embodiment of the present invention.

FIG. 9 shows an LECIM link expander in the LECIM network according to the exemplary embodiment of the present invention.

The LECIM link expander may function as a repeater that retransmits a frame for extending the network's range between the coordinator and the endpoint device, and may be installed in a place where energy can be replaced. The LECIM link expander may be used in a poor wireless network environment between a coordinator and an endpoint device or to extend a transmission range by retransmitting a frame transmitted to an endpoint device having no limit in energy consumption from the coordinator or retransmitting a frame transmitted to the coordinator from the endpoint device.

Figure 10:
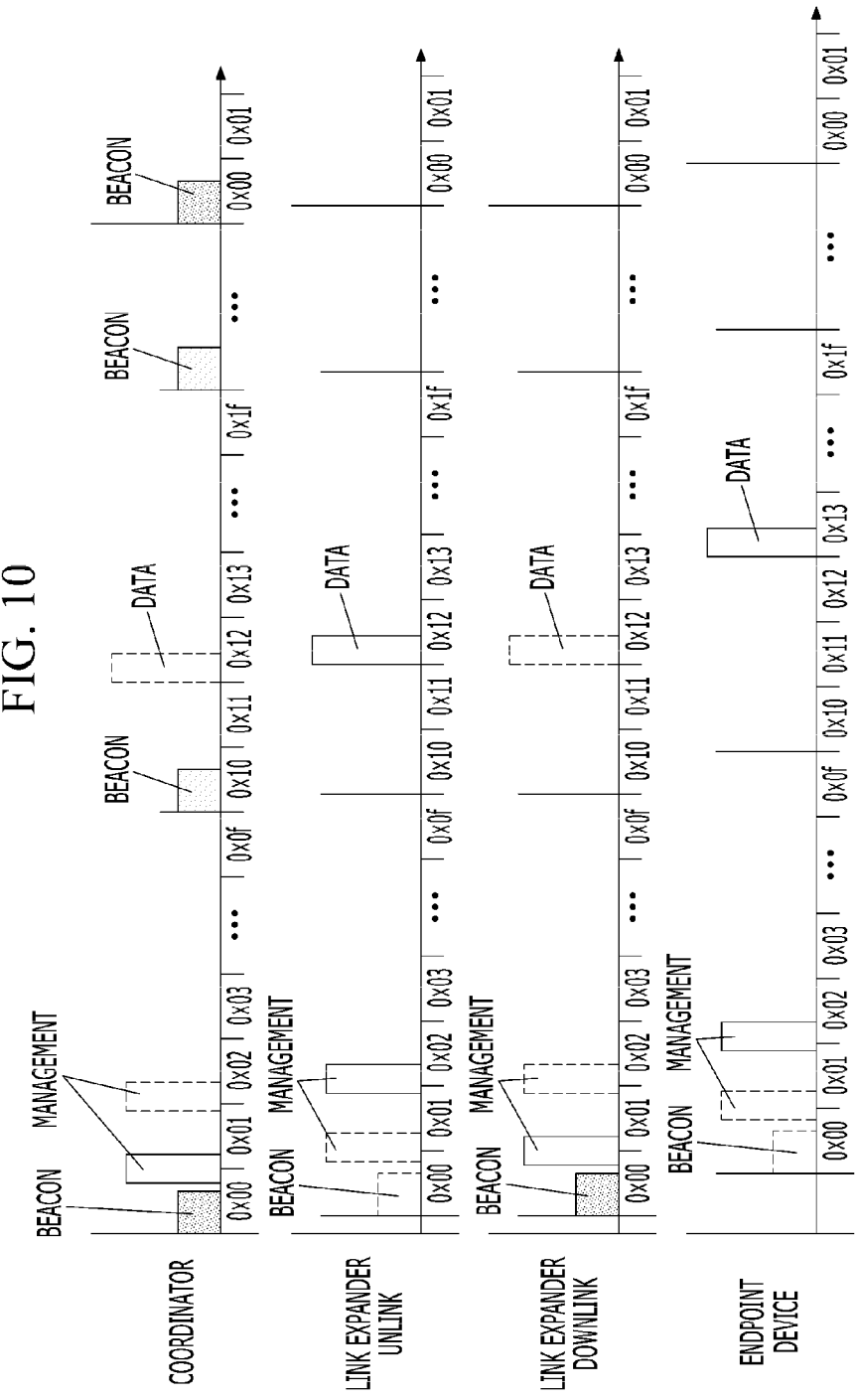
FIG. 10 shows a frame re-transmission method of the LECIM link extension equipment according to the exemplary embodiment of the present invention.

FIG. 10 shows a frame retransmission method of the LECIM link expander according to the exemplary embodiment of the present invention.

According to the exemplary embodiment of the present invention, the LECOM link expander receives a frame, determines whether no frame is identical to the received frame during a time period (n*BI) that corresponds to an integer times the BI, and retransmits the frame if no frame is repeated.

The LECIM link expander may be operated in two modes and thus different frames are retransmitted according to a limitation in energy consumption.

When the LECIM link expander is in a partial link expansion mode, all frames from the coordinator are retransmitted, and frames from the endpoint device are retransmitted with limitation. In the partial link expansion mode, frames from the coordinator may be retransmitted in the same position of down link superframe, and frames positioned management slot from the endpoint device may be retransmitted in the receiving management slot toward the coordinator.

When the LECIM link expander is in the entire link expansion mode, the all the frames received by the LECIM expander are retransmitted in the uplink or downlink superframe. In this case, frames from the coordinator may be retransmitted in the same position of time slot of downlink superframe, and frames positioned management slot and data slot from the endpoint device may be retransmitted in the same position of superframe toward coordinator.

The LECIM link expander retransmits frames respectively according to uplink and downlink time slots without CCA, and does not require an ACK message determination process.

Figure 11:
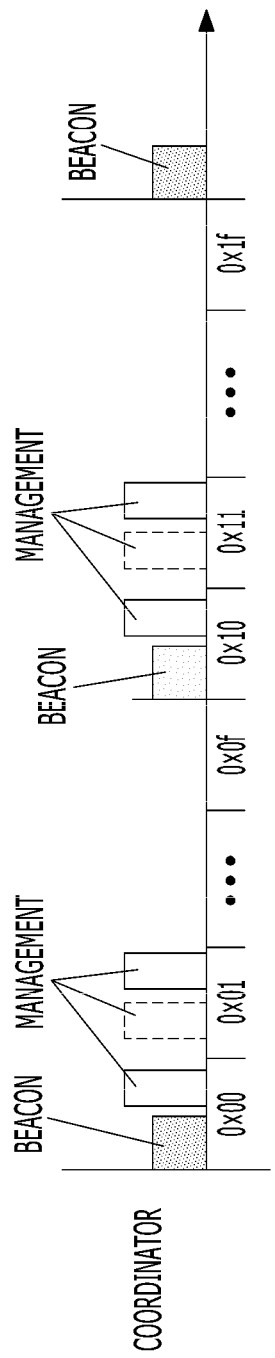
FIG. 11 shows a time slots that contain the management message to be transmitted to the coordinator or received from the coordinator according to the exemplary embodiment of the present invention.

FIG. 11 shows time slots that contain the management message transmitted to and received from the coordinator according to the exemplary embodiment of the present invention.

The time slot shown in FIG. 11 may be used in management and control of the LECIM network link. Referring to FIG. 11, a time slot for beacon transmission may be used only for link management and frame control from the coordinator to the endpoint device.

For the LECIM network link management, a slot after the beacon is used for transmission and reception of frames between the coordinator and the endpoint device, and the number of slots to be used may be set when a network is formed. In this case, the coordinator, the link expander, and the endpoint device attempt transmission in the slot using CCA and random backoff.

For link management and frame control, information elements of a media access control frame header (MAC frame header) are used, and frame types include a device status response request frame (hereinafter referred to as "DeviceStatusRepReq"), a device link control frame (hereinafter referred to as "DeviceLinkControl"), a device link information frame (hereinafter referred to as "DeviceLinkInfor"), a device status response frame (hereinafter referred to as "DeviceStatusRep"), and a device link information request frame (hereinafter referred to as "DeviceLinkInforReq"). The DeviceStatusRepReq frame, the DeviceLinkControl frame, and the DeviceLinkInfor frame are used by the coordinator, and the DeviceStatusRep frame and the DeviceLinkInforReq frame are used by the endpoint device.

When receiving a frame, the endpoint device measures a received signal strength indicator (RSSI) and a link quality indicator (LQI) to estimate a transmission/reception (TX) energy level of the endpoint device, and transmits the estimated TX energy level as the DeviceStatusRep frame.

When receiving the DeviceStatusRep frame from the endpoint device, the coordinator transmits the RSSI and LQI measured in reception of the DeviceStatusRep frame from the device through the DeviceStatusRepReq frame to perform energy management by controlling the TX energy level of the device.

According to the exemplary embodiment of the present invention, prompt and efficiency time synchronization can be achieved by using the time synchronization method for the beacon-based critical infrastructure network. In addition, three grades of link access are provided to minimize contention with other endpoint devices, reduce energy consumption, and provide various quality data transmission methods. Further, frame structure and process for link generation, link management, and range extension of the LECIM network are provided so that the devices included in the LECIM network can be operated with low energy, thereby improving the lifespan of the LECIM network.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A time synchronization method of a device included in personal area networks (PAN), comprising:
    receiving a plurality of beacons from a coordinator included in the network;
    estimating a reception time of an $n^{th}$ beacon after the received plurality of beacons;
    checking a real reception time of the $n^{th}$ beacon;
    calculating a clock drift that is a difference between the estimated reception time and the real reception time; and
    applying the clock drift to the time synchronization based on statistical processing of the clock drift;
    wherein the estimating the reception time comprises:
    estimating a beacon interval based on the received beacons;
    calculating a sleep time based on the estimated beacon interval;
    sleeping for the sleep time, and waiting reception of a first beacon from the coordinator during a beacon reception waiting time;
    when receiving the first beacon, estimating the reception time of the $n^{th}$ beacon to obtain the estimated reception time, based on the estimated beacon interval and serial number information included in the first beacon;
    when reception of a third beacon has failed, changing the beacon reception waiting time and waiting for reception of the third beacon from the coordinator during the changed beacon reception waiting time; and
    when the reception of the third beacon has failed during the changed beacon reception waiting time, extending the sleep time, sleeping for the extended sleep time, and then waiting for reception of the third beacon from the coordinator during the beacon reception waiting time.

2. The time synchronization method of claim 1, wherein the estimating the beacon interval comprises:
    estimating a reception time of a second beacon based on the received first beacon and a clock of the device;
    calculating an offset that is a difference between the estimated reception time of the second beacon and an actual reception time of the second beacon; and
    estimating the beacon interval based on the calculated offset of the second beacon.

3. The time synchronization method of claim 1, wherein the beacon reception waiting time is determined with reference to time consumed in transmission of a frame including at least one beacon along with the plurality of beacons by the coordinator.

4. A method for a link expander to access a coordinator included in personal area networks (PAN), comprising:
  determining which of at least one of a plurality of candidate time slots to use based at least partly on whether an acknowledgement message is received, wherein the plurality of candidate time slots including first, second, and third candidate time slots that are determined by the coordinator according to grades of link access; and
  transmitting data using at least one of the plurality of candidate time slots;
  wherein the transmitting of the data comprises:
  transmitting the data using the first candidate time slot;
  sleeping until receiving a first beacon;
  when the first beacon is received, searching for reception of the acknowledgement message with respect to data from the coordinator during a time slot in which the first beacon is included;
  when the acknowledgement message is not received during the time slot in which the first beacon is included, retransmitting the data using the second candidate time slot;
  sleeping until receiving a second beacon; and
  when the second beacon is received, searching for reception of the acknowledgement message from the coordinator during a time slot in which the second beacon is included.

5. The method of claim 4, further comprising not determining reception of an acknowledgement message with respect to the data.

6. The method of claim 4, further comprising, after the transmission of the data using the first candidate time slot, searching for reception of an acknowledgement message with respect to the data from the coordinator during the first candidate time slot and sleeping until receiving the first beacon when the acknowledgement message is not received during the first candidate time slot, and further comprising, after the transmission of the data using the second candidate time slot, searching for reception of an acknowledgement message with respect to the data from the coordinator during the second candidate time slot and sleeping until receiving the second beacon when the acknowledgement message is not received during the second candidate time slot.

7. The method of claim 4, wherein, when the acknowledgement message is not received during the time slot in which the second beacon is included, the data is retransmitted using the plurality of candidate time slots in a next multi-superframe.

8. The method of claim 4, wherein the plurality of candidate time slots are determined by performing a modulo operation on a value obtained by hashing the address of an endpoint device and the entire number of time slots.

9. The method of claim 4, wherein the address of an endpoint device is hashed by at least three orthogonal hashing functions.

10. The method of claim 4, further comprising transmitting an urgent message to the coordinator using the earliest slot among the plurality of candidate time slots.

* * * * *